Jan. 7, 1941.   A. E. ANDERSON   2,227,993
MOUNTING ELECTRICAL APPARATUS
Filed March 16, 1939   2 Sheets-Sheet 2
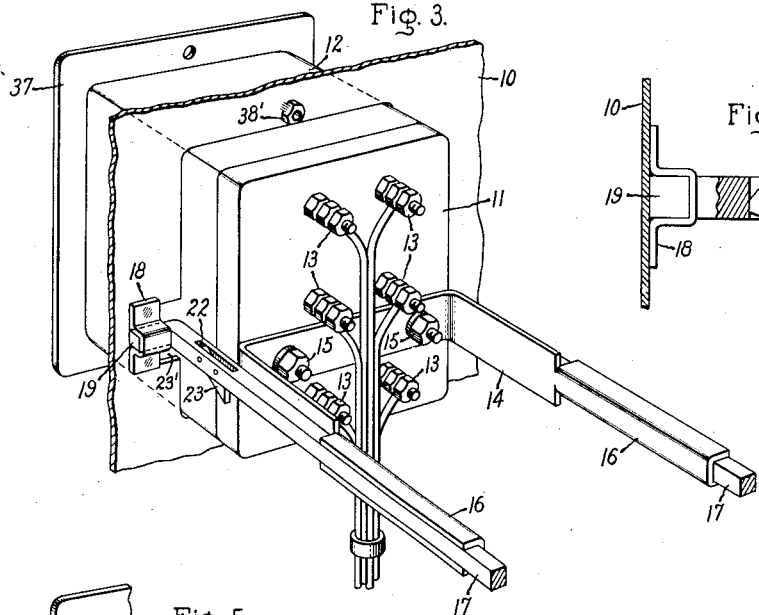
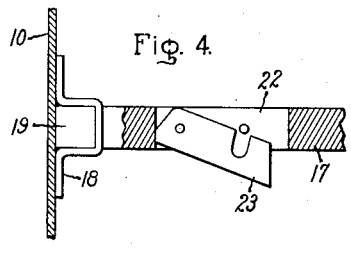
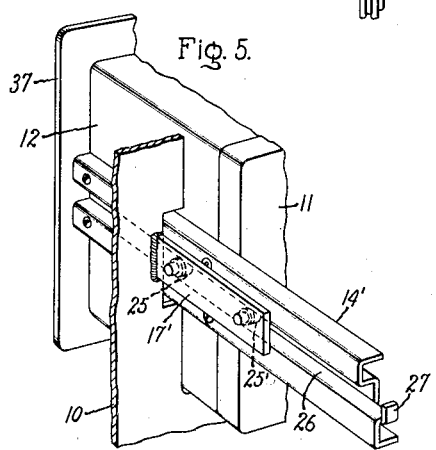
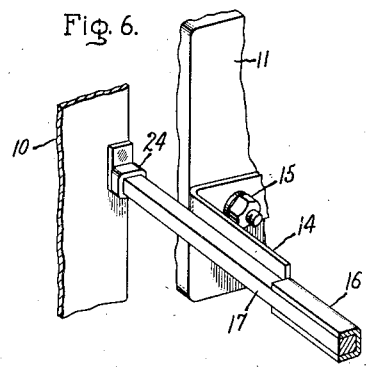
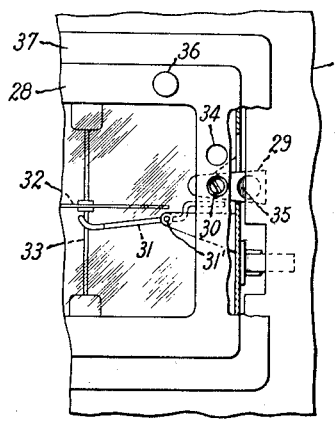
Inventor:
Arvid E. Anderson,
by Harry E. Dunham
His Attorney.

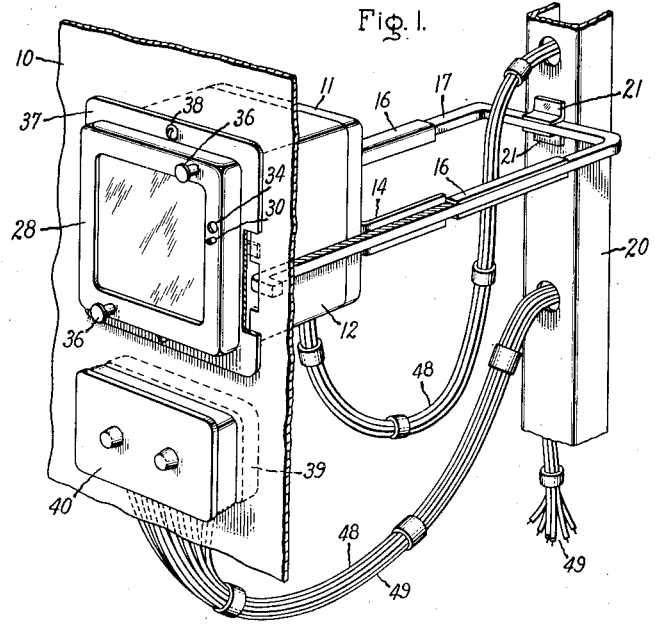
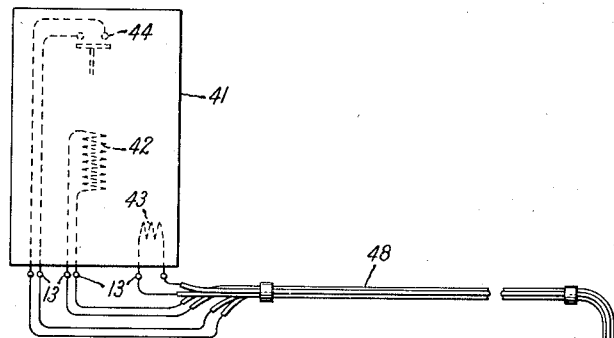
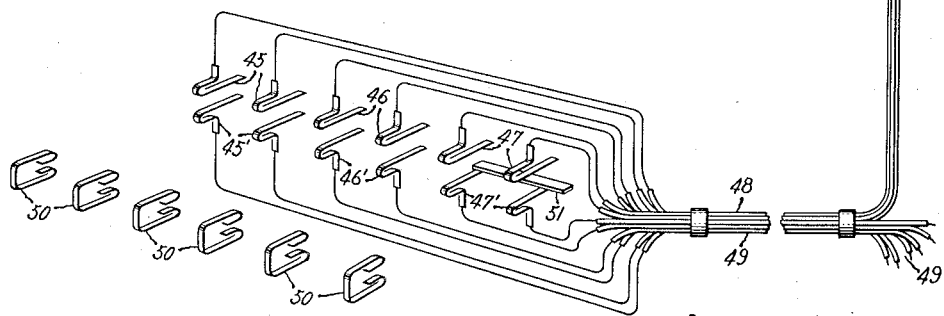

Patented Jan. 7, 1941

2,227,993

UNITED STATES PATENT OFFICE 2,227,993

MOUNTING ELECTRICAL APPARATUS

Arvid E. Anderson, Drexel Hill, Pa., assignor to General Electric Company, a corporation of New York Application March 16, 1939, Serial No. 262,225

12 Claims. (Cl. 175—298)

My invention relates to improvements in mounting electrical apparatus on switchboards and more particularly the flush mounting of electroresponsive devices such as relays, meters and the like.

Surface mounting, that is, mounting electrical apparatus on the front of the switchboard is objectionable since differences in size, shape, etc., of the various devices produce an irregular canyonlike effect thereby causing shadows and reduction in visibility.

Moreover, such lack of uniformity would cause some devices to stand out more prominently than others whose functions might be just as important or even more so. However, the devices were partly accessible from the front of the switchboard for inspection, maintenance and testing, particularly when the switchboard was provided, as shown, for example, in United States Letters Patent 1,718,529, dated June 25, 1929, with some form of test block, plug and cover, or the like, suitably coordinated with the device. The desire for better visibility, more uniformity and improved appearance resulted in the so-called flush mounting wherein the face or front of the device is substantially in the plane of the switchboard. But, with this mounting, accessibility from the front of the switchboard is almost lost because so much of the device is back of the switchboard where it is undesirable, inconvenient and at times dangerous to work.

In accordance with my invention, I provide an improved mounting such that the device can be readily withdrawn to one side of the mounting means such, for example, as the front of the switchboard or completely removed therefrom whereby to preserve all the advantages of flush mounting and yet provide the desired front-of-the-board accessibility for inspection, maintenance, replacement, and testing. Also, in accordance with my invention, I provide a mounting such that a device can be quickly and easily withdrawn to the front of the board for examination without any danger of false operations or the necessity for disconnecting the wiring with the possibility of subsequent improper reconnections when the device is moved back to the flush position whereby to encourage more frequent inspection and such maintenance and testing as can be done without taking the device off the board. These and other objects of my invention will appear in more detail hereinafter.

My invention will be better understood from the following description when considered in connection with the accompanying two sheets of drawings, and its scope will be pointed out in the appended claims.

In the accompanying drawings, Fig. 1 illustrates in perspective a flush mounted electrical device embodying my invention with the device in the normal switchboard position; Fig. 2 is a schematic drawing illustrating the connections of a relay device comprising a current winding, a potential winding, and a control circuit; Fig. 3 is a perspective view from the rear of the switchboard of an electroresponsive device mounting embodying my invention, the device being shown partially withdrawn to the front of the board; Fig. 4 is an elevation partly in section of a releasable locking mechanism tending to prevent complete withdrawal of the device from the switchboard; Figs. 5 and 6 are partial perspective views showing modifications of the mounting illustrated in Fig. 3; and Fig. 7 is a partial front elevation of a detail of my invention for locking the mechanism of the device in an inoperative position and also locking the device in its normal position with respect to the switchboard.

The several figures of the drawing exemplify my invention in an electroresponsive device flush mounting on a mounting surface such as a switchboard 10. This mounting is illustrated as comprising a base 11 and a casing 12 which embraces the base and is suitably secured thereto and within which the electroresponsive device, not shown, is housed, as will be obvious to those skilled in the art to which my invention pertains. The switchboard 10 may be of metal or any suitable material, examples of which are well known to the art. The base 11 on which the electroresponsive device is mounted is provided at the rear, as shown in Fig. 3, with the necessary terminals 13 the number and character of which obviously depend on the type of device.

In accordance with my invention, I provide means for supporting the electroresponsive device together with its housing and base for movement through an opening in the front of the switchboard 10 to and from a normal switchboard position, shown in Fig. 1, with the terminals 13 toward the rear of the switchboard. As shown in Fig. 1, this supporting means comprises a carriage, such, for example, as a bracket or U-shaped member 14 which is suitably secured to the base 11, as by bolts 15, and which includes channel shaped portions 16 slidably engaging a suitable support 17. As shown in Fig. 1, this support, such as a track is a U-shaped bar which may be secured to the switchboard 10 by channel shaped brackets 18, as shown in Fig. 3. These, as shown, form pockets for outstanding leg portions 19 of the bar 17. The brackets 18 may be welded or otherwise suitably secured to the switchboard. The loop portion of the bar 17 at the rear of the switchboard may be supported in any suitable manner, as for example, by a vertical wiring trough 20 provided with supporting means such as lugs 21 which may be welded or otherwise secured to the wiring trough and which embraces the rod 17, as shown in Fig. 1.

In order to prevent complete withdrawal of the electroresponsive device from the switchboard without some forethought on the part of the operator, one leg of the support 17 may be slotted, as at 22, and provided with a biased latch 23 which normally stands in the position shown in Figs. 3 and 4 in the path of movement of one of the channel portions 16 of the carriage 14 whereby to limit the outward movement of the carriage. However, by inserting a tool, such as a screw driver or the like, into the switchboard opening 23' adjacent the slotted end of the support 17, the latch 23 may be moved into the slot 22 so as to permit the withdrawal of the electroresponsive device through the opening in the switchboard.

Obviously, as far as my invention is concerned, the cooperating supporting means at the rear of the switchboard end on the electroresponsive device, for effecting movement thereof relatively to the switchboard, may take many forms. Thus instead of having the switchboard end of the supporting bars 17 bracketed, as shown in Fig. 3, they may be set in square pockets 24 of metal welded or otherwise suitably secured to the switchboard 10, as shown in Fig. 6. With this arrangement, however, the electroresponsive device cannot be fully withdrawn from the switchboard without uncoupling the carriage 14 from the base 11. However, with the modification shown in Fig. 5, which is particularly suitable for the support of relatively heavy devices, complete withdrawal is possible as with the arrangement shown in Fig. 3. Thus, as shown in Fig. 5, the support is in the form of a flat bar 17' at each side of the switchboard opening through which the electroresponsive device is to be inserted. This bar 17' may be welded or otherwise suitably secured to the switchboard 10. On this support 17' are mounted rollers 25 and 25' which engage a trackway, such as a channel 26 in the carriage 14', suitably secured to the casing 12. For general economy in manufacturing and structure, the carriage 14' may be channeled, as shown, for maximum stiffness with minimum weight. In order that an operator may not unthinkingly pull the electroresponsive device straight off the switchboard, the upper portion of the support 14' is cut back, as shown, and the lower portion provided with an upstanding leg 27 so that, when the device is pulled straight out, the rear roller 25' engages the lug 27, but by slightly tipping the front end of the device upwardly about the front roller 25 as a fulcrum, the carriage 14' may be disengaged from the rear roller 25' and subsequently from the roller 25 to permit the complete withdrawal of the electroresponsive device.

Inasmuch as jar or shock in moving an electroresponsive device, such as a relay, may result in a false contact controlling operation which would cause, for example, a false control operation, such as an unwanted and unnecessary tripping of a circuit breaker with loss of load and other service interruption, I provide, in accordance with my invention, means for blocking the movable contact mechanism of the device against movement. Further, in accordance with my invention, to make certain that the mechanism is blocked before the device can be withdrawn, I provide means for interlocking the device with the switchboard so cooperatively related that, simultaneously with the release of the device from the switchboard, the possibility of false operation is eliminated. Thus, as shown in Fig. 7, I may mount in the case 12 a pivoted locking member 29 which in the locking position shown lies with one end back of the switchboard 10. This member 29 may be turned counter-clockwise by use of a screw driver, for example, in its slot-headed pivot 30. For blocking the mechanism, the left-hand portion of the member 29, as viewed in Fig. 7, may be cam shaped to engage a blocking member, such as a lever 31, pivoted at 31' in the case 12 and arranged to engage the movable mechanism of the device whereby to block it against movement. While the operation preventing feature of my invention is generally applicable to relays and the like, the relay is illustrated in Fig. 7 simply by a movable mechanism comprising an induction disk 32 mounted on a shaft 33, the remaining parts of the relay being omitted since the structure will be obvious to those skilled in the art. Thus counterclockwise movement of the locking cam 30 turns the blocking lever 31 clockwise to engage the disk 32 and hold it against movement by raising it off its lower pivot, for example.

In order to know definitely when the locking member 29 is in the blocking position, the cover 28 may be provided with a peep hole 34 through which a spot 35 on the locking member 29 is visible when the member is in the blocking position. One or more thumb nuts 36 for fastening the cover 28 to the casing 12 or the device base may be provided, as is well known to the art. Also the casing flange 37 may be secured to the switchboard by suitable means, such as screws 38, whereby to hold the mounting securely against movement relatively to the switchboard. As will be apparent the flange 37 covers the minor openings such, for example, as those near the brackets 18 and bordering the main switchboard or panel opening. The screws 38 may engage nuts 38' suitably secured to the back of the board as by welding or otherwise.

In order that the device may be withdrawn toward the front of the switchboard 10 without removing any wiring connections and also that it may be removed from the front of the switchboard with a minimum number of disconnections and further for testing in place on the switchboard, I provide suitable wiring and connecting means such as a terminal block 39 mounted on the switchboard 10 at the rear thereof and a cooperating plug or cover 40 operable from the front of the board. This cooperating terminal block and cover may be of the type disclosed in United States Letters Patent 1,718,529, issued June 25, 1929, since, as disclosed in this patent, a cooperating test plug may be used greatly to facilitate and simplify testing at the switchboard. For a clearer understanding of the wiring, reference will be had to Fig. 2 which is a schematic diagram showing an electroresponsive device, such as a relay 41 comprising a voltage winding 42, a cooperating current winding 43 and contacts 44. Between the terminals 13 on the base 11 and contact terminals 45, 46 and 47 in the terminal block 39, indicated schematically in Fig. 2, I run conducting means, such as flexible leads or wires 48, which may be bunched and which may also be partly in a wiring trough 20, as shown. To cooperating terminal contacts 45', 46', 47' on the block 39, I connect the switchboard wiring 49 which may be bunched with the wires 48 between the terminal block 49 and the wiring trough 20, as shown in Figs. 1 and 2. The wires 49, of course, go to current and potential transformers, control circuits, etc., as will be obvious to those skilled in the art. On the cooperating plug or terminal block cover 40, as shown schematically in Fig. 2, are bridging contacts 50, one for each pair of cooperating terminal contacts on the terminal block 39. Thus when the cover or plug 40 is in place, as shown in Fig. 1, the electroresponsive device is connected in circuit for operation. Inasmuch as current transformers should not be permitted to be open circuited, certain contacts, such as 47', may be arranged to engage a short-circuiting bar 51 upon removal of the plug 40.

With the foregoing arrangement, it will be apparent that the electroresponsive device may be deenergized by removing the plug 40 and then withdrawn after releasing the parts holding it to the switchboard. Testing on the switchboard can be accomplished by use of a test block insertable in place of the cover 40, as disclosed in the aforesaid Patent 1,718,529. If the device is to be completely removed from the switchboard, then, after deenergization by removal of the plug 40, the flexible connections 48 are disconnected from the terminals 13 after withdrawing the device to the front of the board sufficiently to attain access to these terminals or the device may be taken off the board due to the extra length of the wires 48 and then disconnected. Replacement may, of course, be effected in the reverse order.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent in the United States is:

1. In combination, a switchboard having wiring at the rear thereof, an electrical device having terminals, means for supporting said device in a normal position on the switchboard with said terminals to the rear of the switchboard and in another position to the front of the switchboard with said terminals accessible from the front of the switchboard comprising a plurality of cooperating means respectively secured to the rear of the switchboard and at the terminal side of said device engageable from the front of the switchboard through an opening therein and wholly operable from the front of the switchboard to effect translatory movement of the device, and means operable from the front of the switchboard for readily establishing and disestablishing electric current conducting connections between said terminals and the wiring at the rear of the switchboard.

2. In a switchboard mounting for an electroresponsive device provided with terminals and having a movable mechanism, means for supporting said device for movement transversely to the switchboard through an opening therein to and from a normal switchboard position with the terminals of the device toward the rear of the switchboard, means for blocking the movable mechanism of said device against movement, and means for interlocking said device with the switchboard to prevent movement of the device through the opening in the switchboard, said blocking means and said interlocking means being cooperatively arranged so that the release of the interlocking means establishes the blocking action of the blocking means.

3. In a switchboard mounting for an electroresponsive device provided with terminals and having a movable mechanism, means for supporting said device for movement transversely to the switchboard through an opening therein to and from a normal switchboard position with the terminals of the device toward the rear of the switchboard, means for blocking the movable mechanism of said device against movement, and means for interlocking said device with the switchboard to prevent movement of the device through the opening in the switchboard.

4. In combination, mounting means, an electrical device having a movable mechanism, means for moving said device relatively to said mounting means, blocking means for preventing movement of the movable mechanism of said device, and means for interlocking said device and said mounting means to prevent relative movement thereof, said blocking means and said interlocking means being cooperatively arranged so that the release of the interlocking means establishes the preventive action of the blocking means.

5. In combination, mounting means having wiring on one side thereof, an electrical device having terminals, means for supporting said device in a normal position on said mounting means with said terminals to one side of the mounting means and in another position to the other side of the mounting means with said terminals accessible from said other side of the mounting means comprising two cooperating means respectively secured to said one side of the mounting means and at the terminal side of said device engageable from the other side of the mounting means through an opening therein and wholly operable from said other side of the mounting means to effect translatory movement of the device and flexibly extensible conducting means between said terminals and said wiring whereby said device may be moved to said other position for inspection without disconnection from service.

6. In combination, mounting means having wiring on one side thereof, an electrical device having terminals, means for supporting said device in a normal position on said mounting means with said terminals to one side of the mounting means and in another position to the other side of the mounting means with said terminals accessible from said other side of the mounting means comprising cooperating track and carriage means respectively secured to said one side of the mounting means and at the terminal side of said device engageable from said other side of the mounting means through an opening therein and operable from said other side to effect translatory movement of the device, and means operable from said other side of the mounting means for readily establishing and disestablishing electric current conducting connections between said terminals and the wiring at said one side of the mounting means including terminals on said mounting means and flexibly extensible conductors between the terminals on the device and the mounting means.

7. In combination, mounting means having wiring on one side thereof, an electrical device having terminals, means for supporting said device for movement to and from a normal position on said mounting means through an opening therein with said terminals at said one side of the mounting means and in another position on said other side of the mounting means with said terminals accessible from said other side of the mounting means comprising two relatively movable cooperating elements respectively secured to said one side of the mounting means and at the terminal side of said device, and cooperating plug and terminal block means operable from the other side of the mounting means for readily establishing and disestablishing electric current conducting connections between said terminals and the wiring on said one side of the switchboard.

8. In combination, a switchboard having wiring at the rear thereof, an electroresponsive device provided with terminals, means for supporting said device for movement transversely to the switchboard through an opening therein to and from a normal switchboard position with the terminals of the device toward the rear of the switchboard and in another position to the front of the switchboard with said terminals accessible from the front of the switchboard comprising cooperating track and carriage means respectively secured to the switchboard at the rear thereof and to the terminal side of said device engageable from the front of the switchboard through an opening therein and wholly operable from the front of the switchboard to effect translatory movement of the device, a terminal block mounted on the switchboard, flexibly extensible conducting means connecting the terminals of said device to certain terminals of said block, switchboard wiring connected to other terminals of said block, and a plug operable from the front of the switchboard for engaging the terminals of said block whereby to establish connections between said conducting means and said wiring.

9. In combination, mounting means, an electrical device provided with relatively movable cooperating contacts, means for supporting said device for movement relatively to said mounting means, means for preventing a circuit controlling action of said contacts, and means for interlocking said device and said mounting means to prevent relative movement thereof releasable to permit such movement only after the operation of said contact controlling action preventing means.

10. In a switchboard mounting for an electroresponsive device provided with terminals and having cooperating contacts, means for supporting said device for movement transversely to the switchboard through an opening therein to and from a normal switchboard position with the terminals of the device toward the rear of the switchboard, means for holding said device in the normal position and for permitting circuit controlling action of said contacts in this position operative to release the device for movement through the opening in the switchboard and to prevent such circuit controlling action during the movement of the device relatively to the switchboard.

11. In a switchboard mounting for an electroresponsive device provided with terminals, means for supporting said device for movement transversely to the switchboard through an opening therein to and from a normal switchboard position with the terminals of the device toward the rear of the switchboard, means for preventing the operation of said device, and means for interlocking said device and the switchboard to prevent movement of the device through the opening in the switchboard, said operation preventing means and said interlocking means being cooperatively arranged so that the release of the interlocking means establishes the preventive action of the operation preventing means.

12. In a switchboard mounting for an electroresponsive device provided with terminals and cooperating contacts, means for supporting said device for movement transversely to the switchboard through an opening therein to and from a normal switchboard position with the terminals of the device toward the rear of the switchboard, means for preventing operation of the contacts of said device, and means for interlocking said device and the switchboard to prevent movement of the device through the opening in the switchboard, said operation preventing means and said interlocking means being cooperatively arranged so that the release of the interlocking means establishes the preventive action of the operation preventing means.

ARVID E. ANDERSON.